Dec. 10, 1963     S. LOMBARDO     3,113,475
UNIVERSAL TOOL-HOLDER DEVICE MORE PARTICULARLY
FOR BORING AND RECTIFYING WORK
Filed Oct. 16, 1961     7 Sheets-Sheet 1

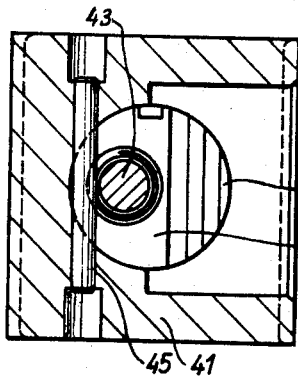
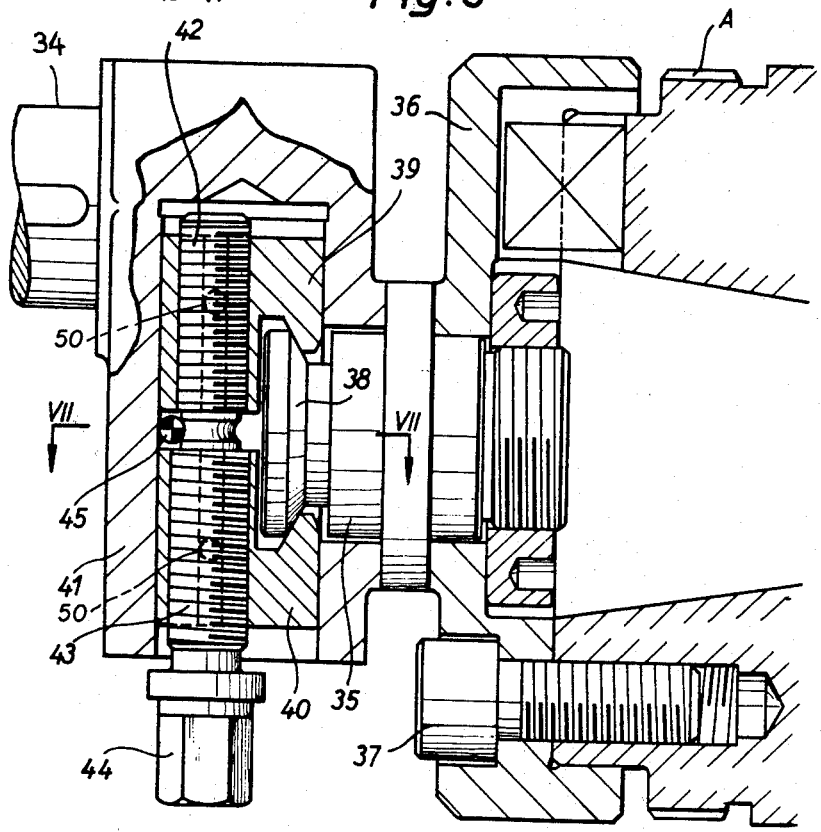

Dec. 10, 1963 S. LOMBARDO 3,113,475
UNIVERSAL TOOL-HOLDER DEVICE MORE PARTICULARLY
FOR BORING AND RECTIFYING WORK
Filed Oct. 16, 1961 7 Sheets-Sheet 4

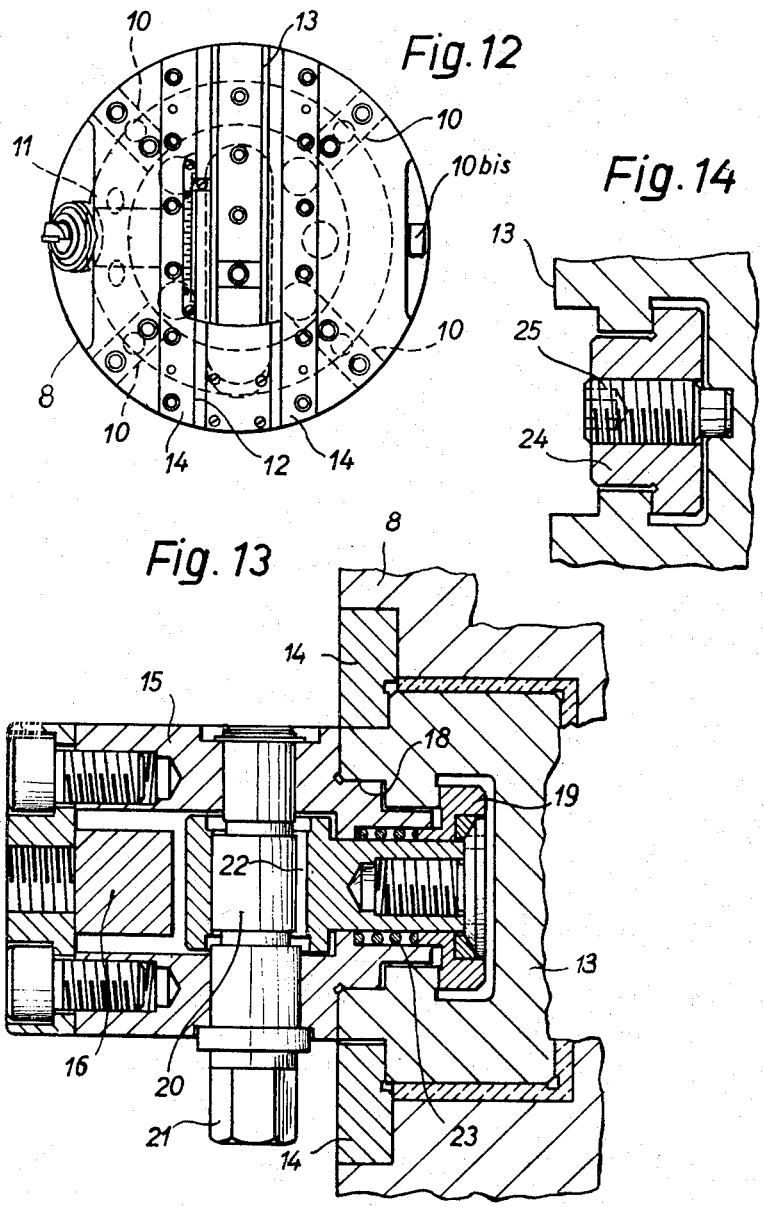

United States Patent Office 3,113,475
Patented Dec. 10, 1963

3,113,475
UNIVERSAL TOOL-HOLDER DEVICE MORE PAR-
TICULARLY FOR BORING AND RECTIFYING
WORK
Salvatore Lombardo, Milan, Italy, assignor to Innocenti
Soc. Gen. per l'Industria Metallurgica e Meccanica,
Milan, Italy
Filed Oct. 16, 1961, Ser. No. 145,360
Claims priority, application Italy Oct. 24, 1960
1 Claim. (Cl. 77—58)

The object of the invention is to produce a tool-holder particularly well adapted for effecting boring and rectifying work in operational conditions that are as easy and efficacious as possible.

The invention has the purpose of producing a universal tool-holder which can be easily adapted to known machines for boring and rectifying.

The invention also has the object of producing a tool-holder effecting boring and rectifying operations in the best precision conditions.

The characteristics of the invention arise out of the claims attached at the end of the description.

The following description applies to the attached drawings showing an example of embodiment of the invention, in which:

FIGURE 6 is a detail view on a larger scale and in longitudinal section showing the assembling means of the components for operating the radial movement of the tool of the boring mandrel of the machine;

FIGURE 7 is a section taken along the line VII—VII of FIGURE 6;

FIGURE 12 is a frontal view of the tool-holder head;

FIGURES 13 and 14 are partial sections taken respectively along the lines XIII—XIII and XIV—XIV of FIGURE 10.

FIGURE 1 shows diagrammatically a milling and boring machine on which the device of the invention can be directly mounted.

This machine comprises a milling mandrel denoted by F and a boring mandrel denoted by A, revolving integrally. The boring mandrel A can accomplish, in relation to the milling mandrel F, an axial stroke $C_1$, while the two mandrels can integrally accomplish an axial stroke $C_2$. The table on which the part for machining is fixed is denoted by T.

Figure 2:
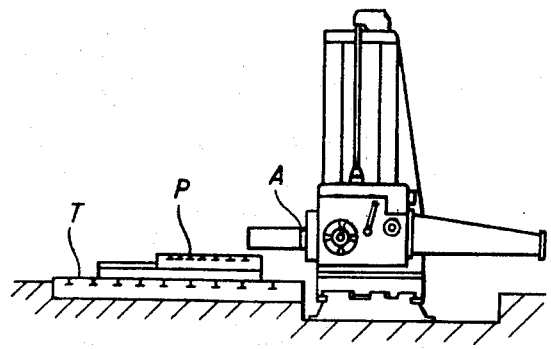
FIGURE 2 is a similar diagrammatic elevation view of a common boring machine, the device being able to be mounted on the machine by employing a movable platform.

On the other hand, FIGURE 2 shows a common boring machine whose boring mandrel A can accomplish an axial stroke $C_1$. A movable platform is fixed on the part-holder table T, which is able to effect a stroke $C_3$ parallel to the axis of the mandrel.

The tool-holder device according to the invention can be mounted on the two types of machines mentioned above.

Figure 3:
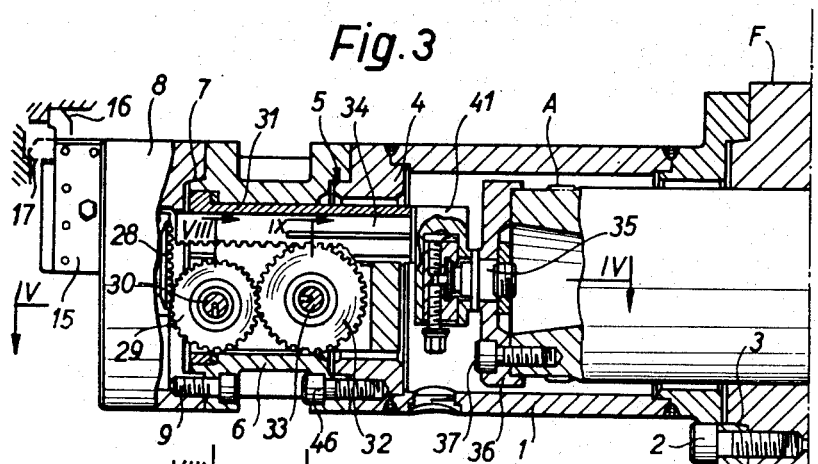
FIGURE 3 is a longitudinal section of the device.
Figure 4:
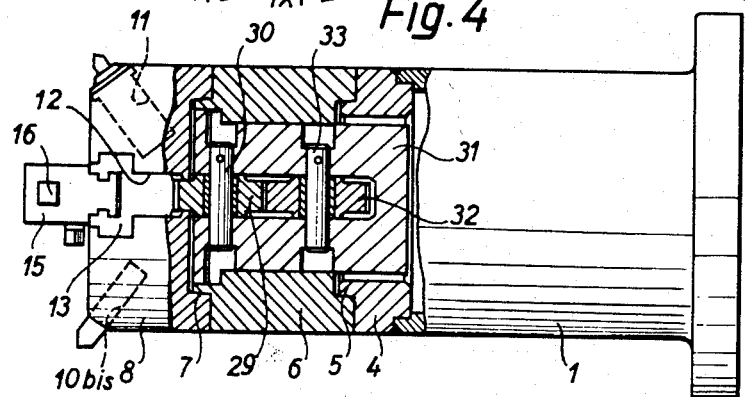
FIGURE 4 is a horizontal section taken along the line IV—IV of FIGURE 3.
Figure 5:
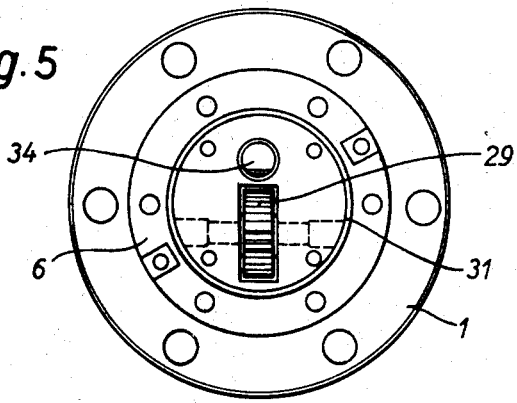
FIGURE 5 is a frontal view of the extension and intermediate support.
Figure 8:
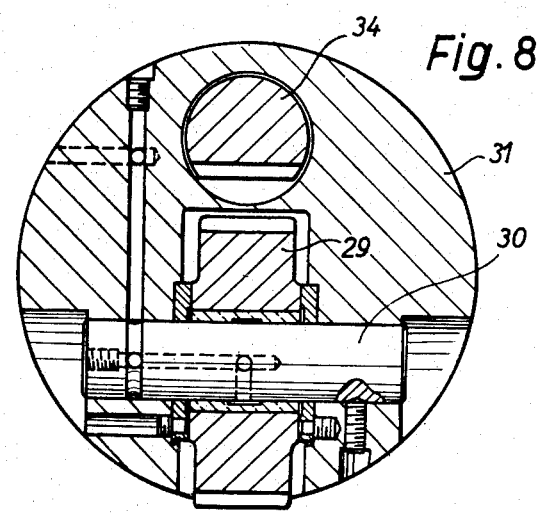
FIGURES 8 and 9 are sections taken respectively along the lines VIII—VIII and IX—IX of FIGURE 3.

With reference to FIGURE 3, the device comprises an extension 1, formed by a tubular shaped element that is fixed frontally, by means of a screw 2, to the milling mandrel F, a centering bearing 3 ensuring perfect axial alignment between the elements.

The extension 1 terminates in a block 4 of annular shape having a circular collar 5 and a series of threaded holes for the centering and fixing of an intermediate support 6 by means of the screws 46.

In its turn, the support 6 is provided with a centering bearing 7 and a series of holes for fixing a head 8 carrying the tools. The head is fixed by means of a series of screws 9.

Figure 1:
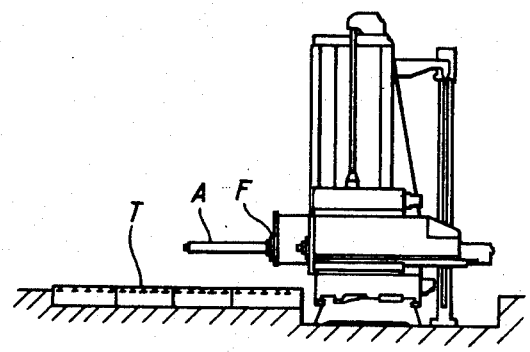
FIGURE 1 is a diagrammatical elevation view of a milling and boring machine, the device being able to be mounted directly on the machine.

The presence of the centering bearings 3, 5 and 7 enable the tool-holder 8 to be fixed in a perfectly co-axial position in relation to the milling and boring mandrels. The tool-holder head is rigidly assembled to the milling mandrel, participating in its rotation and axial stroke $C_2$ in the case of FIGURE 1, whereas in the case of common boring machines, the tool-holder head only makes one rotation movement integrally with the mandrel. In this case, the axial stroke is replaced by the stroke $C_3$ of the movable platform P on which the part is fixed.

The tool-holder head is provided with seatings 10, 10 bis and 11 for accommodating the various types of tools (FIGURE 12) enabling boring work to be carried out through blind borings and finishing borings. Said tools can be adjusted for position so as to enable the boring head to be adapted to an extensive range of diameters.

Figure 10:
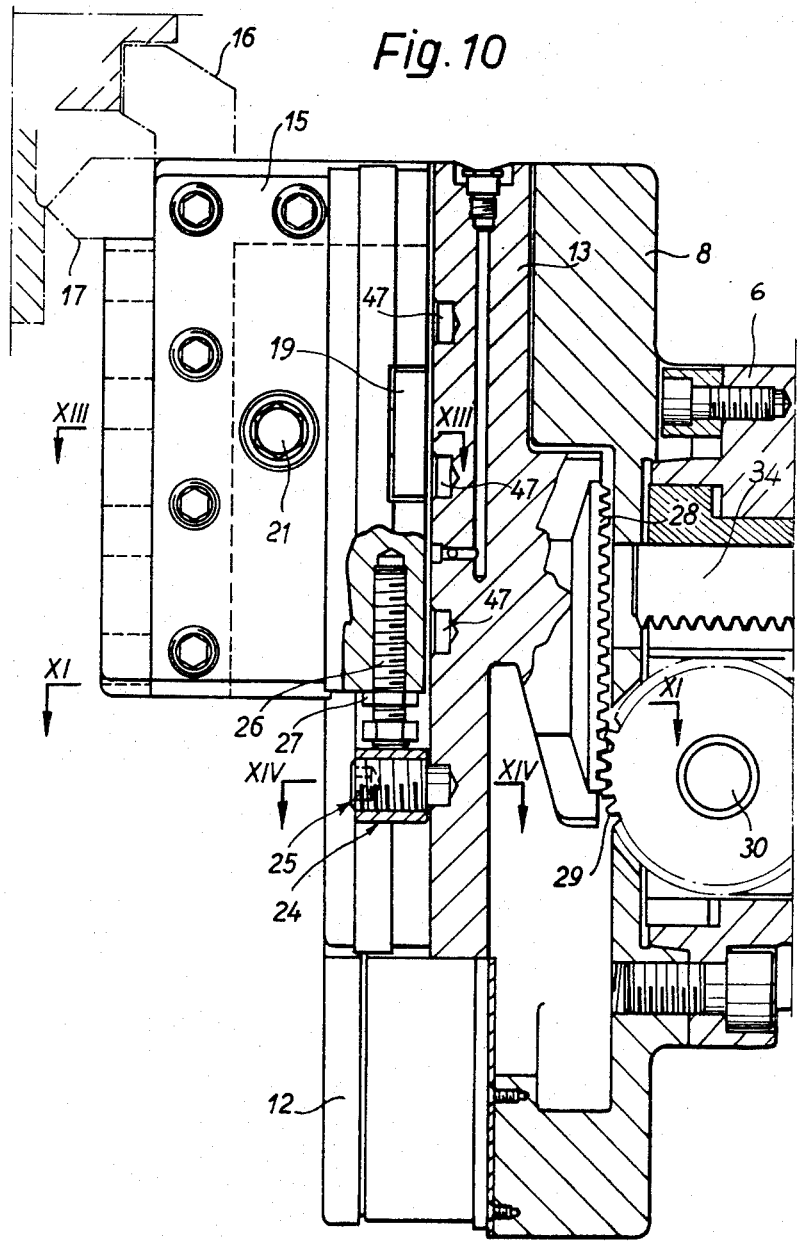
FIGURE 10 is a vertical section of the tool-holder head.
Figure 11:
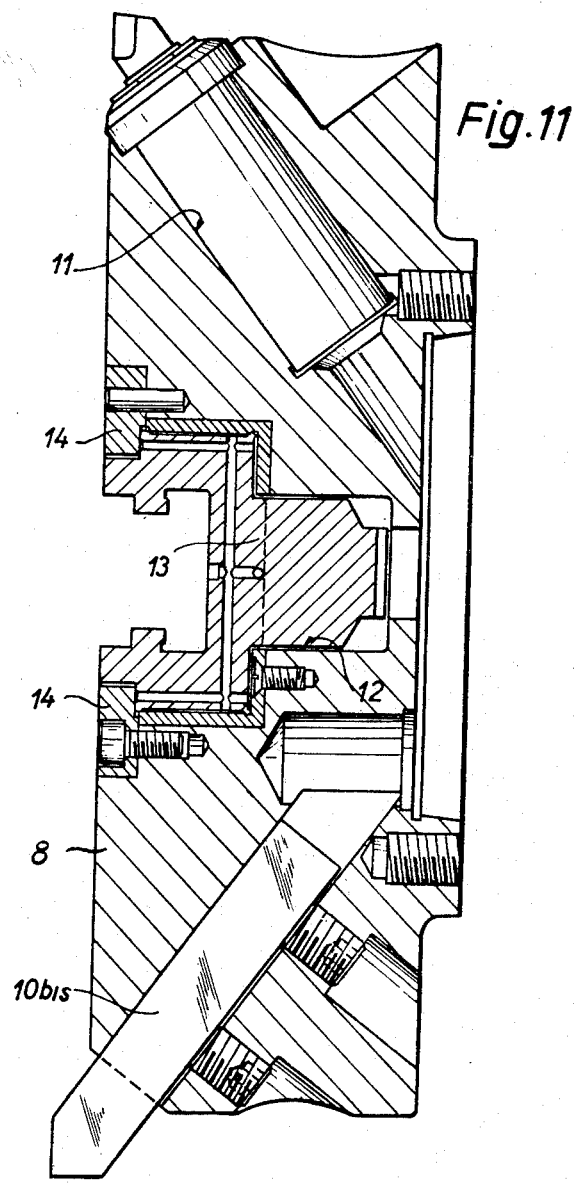
FIGURE 11 is a cross section taken along the lines XI—XI of FIGURE 10.

Furthermore, in the tool-holder head 8, there is a frontal cross guide 12 along which a carriage slidably moves held by stop components 14 (FIGURES 10 and 11). A tool-holder 15 is fixed to this carriage 13 which can be easily and rapidly changed, the tool-holder on which the tool is mounted, of the type shown 16 or 17, able to effect blind boring operations, rectifying or machining grooves.

The tool-holder 15 is housed in a guide 18 (FIGURE 13) of the carriage 13 and rapidly attached to the latter by a block 19 sliding crosswise in relation to the guides 18 and able to exert a pressure inside the guides themselves under the action of a pin rotatably mounted in the tool-holder 15 and provided in its turn with an external hexagonal head 21 and an eccentric cam portion 20. The eccentric cam 20 traverses a cylindrical seat 22 of the block 19 determining by its rotation the crosswise movement of the block 19, relatively the guides 18, thereby locking the tool holder 15 to the carriage 13.

A spring 23 moves the block 19 away when the cam 20 revolves in the opposite direction so as to enable the tool-holder to be dismantled.

Between the carriage 13 and the tool-holder 15 there are also means arranged for maintaining position (FIGURES 10 and 14) formed by a wedge 24 attached by a screw 26 to the carriage 13, adjustable for position in relation to the tool-holder 15 and able to be locked by means of a nut 27.

The head of the screw 26 pressing on the wedge 24 stabilizes the position of the tool-holder 15 by making the search for the position of the tool-holder almost immediate and ascertaining the exact position of the tool-holder in successive mountings. Moreover, along the carriage 13, there is a series of threaded holes 47 acting for fixing the various positions of the holding wedge 24 by the screw 25.

The carriage 13 integral with the tool-holder 15 and the corresponding tool, can slide crosswise in relation to the head so as to enable operations for rectifying and machining internal grooves to be carried out.

This displacement is exactly equal to that of the mandrel of the reamer, and hence it can be read on the sliding-gauge of the mandrel.

This movement is controlled by the axial displacement made by the mandrel A (stroke $C_1$). For this purpose, means are arranged principally contained in the intermediate support 6, intended to convert the axial advancing movement of the boring mandrel A into a crosswise movement of the carriage 13 to which the tool-holder 15 is fixed.

Figure 9:
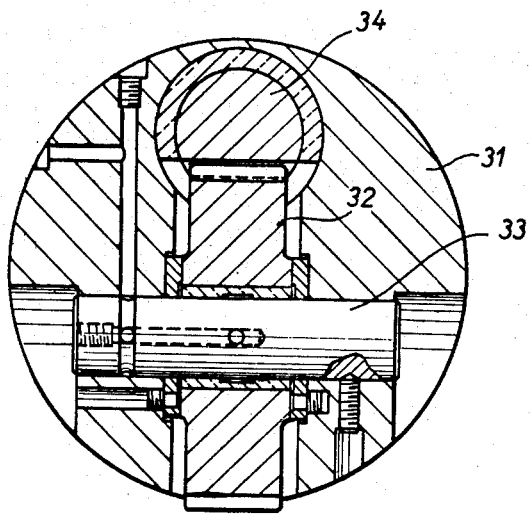

On the side turned towards the mandrels, the carriage 13 (FIGURE 10) is provided with a rack 28 directed crosswise and engaging with a toothed wheel 29 whose spindle 30 is carried by a block 31 (FIGURE 3) fixed inside the intermediate support 6. The toothed wheel 29 meshes in its turn with a toothed wheel 32 whose spindle 33 (FIGURE 9) is carried by the block 31. The toothed wheel 32 meshes with a rack 34 directed longitudinally (FIGURE 3) parallel to the axis of the mandrels, this rack being rigidly associated to the boring mandrel A, so that the axial movement of said boring mandrel determines, by the connections of the teeth already described, the crosswise stroke of the rack 28 integral with the carriage 13.

The association between the longitudinal rack 34 and the boring mandrel A is effected (FIGURE 6) by means of a cylindrical shaped stem 35 provided with a flange 36 able to be co-axially fixed to the boring mandrel A by a series of screws 37. The stem 35 has a profiled end 36 with which a jaw cooperates formed by two key-shaped wedges 39 and 40 able to slide crosswise between a cylindrical seat provided in a head 41 of the longitudinal rack 34.

The wedges or jaws 39 and 40 are provided with threaded holes in which two threaded sections engage in opposite directions 42 and 43, and a screw provided with an external hexagonal head 44 for controlling the rotation by means of a key. The central part of the screw is stopped by a pin 45 which prevents its axial displacement, so that the rotation of the screw 44 determines the advancing or retiring of the jaws 39 and 40, and consequently, the engagement or their disengagement in relation to the profiled part of the stem 38.

The wedges 39 and 40 cannot revolve in their seats because they are stopped by fixed pins 50 in the cylindrical seat of the head 41 housed in the hollow parts of the wedges 39 and 40.

The association between the stem 35—38 integral with the boring mandrels A and the longitudinal rack 34, carried out as described above, enables in actual practice, slight crosswise movements to be effected, and is useful for ensuring a proper mounting of the other, by acting also by the presence of roughnesses 48 and 49 made in the rear part of the wedges 39 and 40.

The extensions 1 and heads 8 carrying the tools are interchangeable so as to be adapted to the various types of machine-tool and the range of working diameters. These replacements can be carried out in a relatively short time, while always ensuring the perfect alignment of the rotation spindles between the heads holding the tools and the mandrels of the machine.

The tool-holder device described above can effect, on milling and boring machines and on common boring machines, all boring, roughing-down, finishing, blind or clearing operations on either side, and also operations for rectifying and machining internal grooves.

It is quite obvious that the invention is not limited to the example of embodiment described and shown above and from which other forms and methods of embodiment can be provided without going outside of the scope of the invention for this purpose.

What I claim is:

In a boring milling and facing machine, having a milling mandrel and a boring spindle coaxial with the mandrel, a tool head for mounting on said milling mandrel, said tool head comprising; a body, a seat on said body for mounting on a centering bearing of said mandrel, a radially disposed slideway on said body, a carriage provided with a tool holder mounted in said slideway, an axial extending rack slidably mounted within said body, means for attaching said rack to the boring spindle, a radially extending rack fast with the carriage, two intermeshing pinions mounted for rotation within said body, one pinion meshing with the first-mentioned rack, the other pinion meshing with the second-mentioned rack, the improvement in said means for attaching the first-mentioned rack to the boring spindle comprising; a cylindrical stem detachably and coaxially fixed in protruding relationship to the boring spindle, a circumferential axially effective abutment on an intermediate portion of said stem, a circumferential groove having a flaring side surface on the free end portion of said stem, a head member fast with said first-mentioned rack provided with a first cylindrical cavity having its longitudinal axis extending transversely of said rack, and a second cylindrical cavity communicating wth the first cylindrical cavity and having its longitudinal axis extending parallel to said rack, said stem having its free end portion loosely projecting through said second cavity into the first cavity, two wedges slidable in the first cavity transversely of the stem into wedging engagement with said groove on the stem, thereby to force the head member against said circumferential abutment, screw means rotatably arranged in said head member transversely of the stem, for simultaneously moving said wedges inwardly into said wedging engagement and means in the head member for locating the screw means against axial displacement in the first cavity.

References Cited in the file of this patent

UNITED STATES PATENTS

| | | |
|---|---|---|
| 1,962,951 | Conwell | June 12, 1934 |
| 2,404,433 | Christman | July 23, 1946 |
| 2,460,092 | Lacey et al. | Jan. 25, 1949 |
| 2,485,799 | Woytych | Oct. 25, 1949 |